United States Patent [19]
Erdtmann et al.

[11] Patent Number: 6,030,439
[45] Date of Patent: Feb. 29, 2000

[54] INK JET PRINTING METHOD

[75] Inventors: David Erdtmann; Lixin Chu; Thomas W. Martin, all of Rochester, N.Y.

[73] Assignee: Eastman Kodak Company, Rochester, N.Y.

[21] Appl. No.: 09/203,261

[22] Filed: Dec. 1, 1998

[51] Int. Cl.$^7$ ..................................................... C09D 11/00
[52] U.S. Cl. .................. 106/31.6; 106/31.77; 106/31.78; 106/31.86
[58] Field of Search ............................... 106/31.6, 31.77, 106/31.78, 31.86

[56] References Cited

U.S. PATENT DOCUMENTS

| | | | |
|---|---|---|---|
| 4,410,364 | 10/1983 | Finlayson et al. | 106/31.6 |
| 4,475,950 | 10/1984 | Finlayson | 106/31.6 |
| 5,089,050 | 2/1992 | Vieira et al. | 106/31.43 |
| 5,275,647 | 1/1994 | Winnik | 106/31.43 |
| 5,574,081 | 11/1996 | Kroon . | |
| 5,616,635 | 4/1997 | Patel . | |
| 5,629,363 | 5/1997 | Abber et al. . | |
| 5,651,813 | 7/1997 | Santilli et al. . | |

*Primary Examiner*—Mark L. Bell
*Assistant Examiner*—Veronica F. Faison
*Attorney, Agent, or Firm*—Harold E. Cole

[57] ABSTRACT

An ink jet printing method, comprising the steps of:

A) providing an ink jet printer that is responsive to digital data signals;
B) loading the printer with ink-receptive substrates;
C) loading the printer with an ink jet ink composition comprising a carrier, from about 0.5% to about 30% by weight of a pigment and from about 0.1 to about 10% by weight of a swelling clay; and
D) printing on an ink-receptive substrate using the ink jet ink in response to the digital data signals.

9 Claims, No Drawings

INK JET PRINTING METHOD

CROSS REFERENCE TO RELATED APPLICATION

Reference is made to commonly-assigned, copending U.S. patent application Ser. No. 09/203,260, filed of even date herewith, (Docket 78664HEC) entitled "Additive For Ink Jet Ink", the teachings of which are incorporated herein by reference.

FIELD OF THE INVENTION

This invention relates to an ink jet printing method which employs an additive for a pigmented ink jet ink to improve the dry time.

1. Background of the Invention

Ink jet printing is a non-impact method for producing images by the deposition of ink droplets on a substrate (paper, transparent film, fabric, etc.) in response to digital signals. Ink jet printers have found broad applications across markets ranging from industrial labeling to short run printing to desktop document and pictorial imaging. The inks used in ink jet printers are generally classified as either dye-based or pigment-based.

A dye is a colorant which is molecularly dispersed or solvated by a carrier. The carrier can be a liquid or a solid at room temperature. A commonly used carrier is water or a mixture of water and organic co-solvents. Each individual dye molecule is surrounded by molecules of the carrier. In dye-based inks, no particles are observable under the microscope. Although there have been many recent advances in the art of dye-based ink jet inks, such inks still suffer from deficiencies such as low optical densities on plain paper and poor light-fastness. When water is used as the carrier, such inks also generally suffer from poor water fastness.

In pigment-based inks, the colorant exists as discrete particles. These pigment particles are usually treated with addenda known as dispersants or stabilizers which serve to keep the pigment particles from agglomerating and settling out of the carrier. Water-based pigmented inks are prepared by incorporating the pigment in the continuous water phase by a milling and dispersing process. Pigmented inks require a water soluble dispersant in the pigment slurry during the milling process. Such a dispersant is necessary to produce a colloidally stable mixture and an ink that can be "jetted" reliably without clogging the print head nozzles.

Dispersing agents in an ink jet ink have the dual function of helping to break down pigments to sub-micron size during the milling process and of keeping the colloidal dispersion stable and free from flocculation for a long period of time.

2. Description of Related Art

U.S. Pat. No. 5,651,813 discloses a typical ink jet pigmented ink. However, there is a problem with using this ink in that the pigment tends to remain on the surface of the ink jet receiver element which causes poor drying characteristics, especially when using a non-porous glossy receiver.

U.S. Pat. No. 5,574,081 relates to an emulsion paint which contains a blocking agent such as poly(ethylene glycol). However, this blocking agent is said to be present at an upper limit of about 2.0% by weight of the pigment. Such a low amount of this material would not enable this composition to function as an ink jet ink since the composition would dry out and clog the ink jet nozzles.

U.S. Pat. No. 5,616,635 relates to an aqueous paint which employs a coalescing solvent of an ether compound. The use of such a compound in an ink jet ink composition would cause the pigment to flocculate and would thus not be useful therein.

U.S. Pat. No. 5,629,363 relates to a ball point pen ink which contains about 12% water. Increasing the water content of this ball point ink would make it inoperative for that purpose since it would not have a high enough viscosity.

It is an object of this invention to provide an ink jet printing method which employs an additive for a pigmented ink jet ink which would improve the drying time when printed onto a receiver, especially a non-porous glossy receiver. It is another object of the invention to provide an ink jet printing method which employs an additive for an ink jet ink which can be easily jetted out of an ink jet nozzle and which will provide an image having a high D-max.

SUMMARY OF THE INVENTION

These and other objects are achieved in accordance with this invention which relates to an ink jet printing method, comprising the steps of:

A) providing an ink jet printer that is responsive to digital data signals;

B) loading the printer with ink-receptive substrates;

C) loading the printer with an ink jet ink composition comprising a carrier, from about 0.5% to about 30% by weight of a pigment and from about 0.1 to about 10% by weight of a swelling clay; and D) printing on an ink-receptive substrate using the ink jet ink in response to the digital data signals.

The swelling clay ink additive used in accordance with the invention is highly effective in improving the dry time of pigmented ink jet inks onto a receiver. These inks are also characterized by having excellent colloidal stability. The ink additive can also be used with a wide variety of inks.

DETAILED DESCRIPTION OF THE INVENTION

The swelling clay used in the invention can be any natural or synthetic material provided it produces the desired results. Such swelling clays include, for example, montmorillonite, bentonite, clinoptilolite, vermiculite, magadite, smectite, laponite, beidellite, etc. In a preferred embodiment of the invention, laponite is used. In another preferred embodiment, the laponite is Laponite® RD or RDS (Laporte Absorbents) which have the following formula:

$$[(Si_8)^{IV}(Mg_{4.8}Li_{0.4})^{VI}.O_{20}(OH)_4]1.34Na^+.$$

Laponite is a synthetic low-charge clay which closely reassembles both the structure and chemical composition of hectorite clay mineral. This type of clay is a trioctahedral analogue of magnesium silicate montmorillonite, but contains significant amount of octahedral Li-for-Mg substitution. Other acidic species can also adsorb on the basal surfaces and in the interlamellar spaces. However, unlike the natural mineral, laponite is very pure and low in metal and other impurities. The primary particles of laponite are discs in shape with approximately 30 nm in diameter and 1 nm in thickness. When these particles disperse in water, especially at relatively high electrolyte concentrations, flocculation occurs. One explanation could be that the electrical charge at the edges differs from that at the faces of the platelet particles.

As noted above, the ink jet ink composition of the invention contains the swelling clay at a concentration of from about 0.10 to about 10.0 weight percent. In a preferred embodiment, the concentration of swelling clay is from about 0.25 to about 5 weight percent.

In the present invention, any of the known organic pigments can be used. Pigments can be selected from those disclosed, for example, in U.S. Pat. Nos. 5,026,427; 5,085,698; 5,141,556; 5,160,370 and 5,169,436, the disclosures of which are hereby incorporated by reference. The exact choice of pigment will depend upon the specific color reproduction and image stability requirements of the printer and application. For four-color printers, combinations of cyan, magenta, yellow and black (CMYK) pigments are used. An exemplary four color set is a cyan pigment, bis(phthalocyanyl-alumino)tetraphenyldisiloxane, quinacridone magenta (pigment red 122), pigment yellow 74 and carbon black (pigment black 7).

A humectant may be added to the ink jet composition employed in the invention to help prevent the ink from drying out or crusting in the orifices of the ink jet printhead. Examples of humectants include, for example, polyhydric alcohols such as ethylene glycol, diethylene glycol, triethylene glycol, propylene glycol, tetraethylene glycol, polyethylene glycol, glycerol, 2-methyl-2,4-pentanediol, 1,2,6-hexanetriol and thioglycol; and nitrogen-containing cyclic compounds, such as, for example, pyrrolidone, N-methyl-2-pyrrolidone, and 1,3-dimethyl-2-imidazolidinone. In a preferred embodiment, a mixture of glycerol and diethylene glycol is employed, especially at a concentration of between 15 and 30 wt. %.

The carrier of the ink jet ink composition employed in the invention is preferably water. In addition, a co-solvent can also be employed. The selection of a co-solvent depends on the requirements of the specific application, such as desired surface tension and viscosity, the selected pigment, drying time of the pigmented ink jet ink, and the type of paper onto which the ink will be printed. Representative examples of water-soluble co-solvents that may be selected include (1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; (2) ketones or ketoalcohols such as acetone, methyl ethyl ketone and diacetone alcohol; (3) esters, such as ethyl acetate, ethyl lactate, ethylene carbonate and propylene carbonate; and (4) sulfur-containing compounds such as dimethyl sulfoxide and tetramethylene sulfone.

Ink Preparation

A preferred method for making the inks employed in the invention is disclosed in U.S. Pat. No. 5,679,138, the disclosure of which is hereby incorporated by reference. In general, it is desirable to make the pigmented in jet ink in the form of a concentrated mill grind, which is subsequently diluted to the appropriate concentration for use in the ink jet printing system. This technique permits preparation of a greater quantity of pigmented ink from the equipment. The mill grind can be diluted with either additional water or water-miscible solvents to make a mill grind of the desired concentration. By dilution, the ink is adjusted to the desired viscosity, color, hue, saturation density and print area coverage for the particular application.

Jet velocity, separation length of the droplets, drop size and stream stability are greatly affected by the surface tension and the viscosity of the ink. Pigmented ink jet inks suitable for use with ink jet printing systems should have a pH in the range of 5 to 9. Anionic and cationic surfactants may be used in the composition of the invention as disclosed in U.S. Pat. Nos. 5,324,349; 4,156,616 and 5,279,654 as well as many other surfactants known in the ink jet ink art. commercial surfactants include the Surfynols® from Air Products; the Zonyls® from DuPont and the Fluorads® from 3M.

Acceptable viscosity's are no greater than 20 centipoise, and preferably in the range of about 1.0 to about 10.0 centipose, more preferably from about 1.0 to about 5.0 centipoise at room temperature.

The ink has physical properties compatible with a wide range of ejecting conditions, i.e., driving voltages and pulse widths for thermal ink jet printing devices, driving frequencies of the piezo element for either a drop-on-demand device or a continuous device, and the shape and size of the nozzle.

A penetrant (0–10 wt. %) may also be added to the ink composition employed in the invention to help the ink penetrate the receiving substrate, especially when the substrate is a highly sized paper. A preferred penetrant for the inks of the present invention is n-propanol at a final concentration of 1–6 wt. %.

A biocide (0.01–1.0 wt. %) may also be added to prevent unwanted microbial growth which may occur in the ink over time. A preferred biocide for the inks of the present invention is Proxel® GXL (Zeneca Colours Co.) at a concentration of 0.05–0.5 wt. %. Additional additives which may optionally be present in ink jet inks include thickeners, conductivity enhancing agents, anti-kogation agents, drying agents, and defoamers.

Ink-receptive substrates useful in ink jet printing are well known to those skilled in the art. Representative examples of such substrates are disclosed in U.S. Pat. Nos. 5,605,750; 5,723,211; and 5,789,070 and EP 813 978 A1, the disclosures of which are hereby incorporated by reference.

Commercially available ink jet printers use several different schemes to control the deposition of the ink droplets. Such schemes are generally of two types: continuous stream and drop-on-demand.

In drop-on-demand systems, a droplet of ink is ejected from an orifice directly to a position on the ink receptive layer by pressure created by, for example, a piezoelectric device, an acoustic device, or a thermal process controlled in accordance with digital data signals. An ink droplet is not generated and ejected through the orifices of the print head unless it is needed.

The following examples illustrate the utility of the present invention.

EXAMPLES

Control Example 1 (C-1)

| Mill Grind | |
|---|---:|
| Polymeric beads, mean diameter of 50 μm (milling media) | 325.0 g |
| Quinacridone magenta (pigment red 122) from Sun Chemical Co. | 30 g |
| Oleoyl methyl taurine, (OMT) sodium salt | 9.0 g |
| Deionized water | 208.0 g |
| Proxel GXL ® (biocide from Zeneca) | 0.2 g |

The above components were milled in a 2 liter double walled vessel obtained from BYK-Gardner using a high energy media mill manufactured by Morehouse-Cowles Hochmeyer. The mill was run for approximately 8 hours at room temperature. The dispersion was separated from the milling media by filtering the millgrind through a 4–8 μm KIMAX® Buchner Funnel obtained from VWR Scientific Products. An aliquot of the above dispersion to yield 1.45 g pigment was mixed with 6.0 g diethylene glycol, 7.5 g glycerol, and additional deionized water for a total of 50.0 g. This ink was filtered through a 3 μm filter and introduced into an empty Hewlett-Packard 51626A print cartridge. Images were made with a Hewlett-Packard DeskJet® 540 printer on Kodak PF Photo-glossy media receiver elements.

A target with strips of D-max (23 cm×1.3 cm) was printed onto the receiver. The total time to print the dry time target was 2.5 minutes. The test target was held for four minutes after ejection from the printer, and then bond paper was placed over the printed target and rolled with a smooth, heavy weight. Then, the bond paper was separated from the printed target. The transferred ink was measured by optical density. The optical density of ink transferred at 4 minutes was measured and represents a "dry time density". An ink which dries very quickly will have no ink transfer, and the "dry time density" value will equal the D-min of the bond paper (0.09) (no ink transfer). The results are shown in Table 1.

Example 1 (E-1)

This ink was made the same as C-1, except 5.0 g of a 5 wt. % dispersion of Laponite® RDS (Laporte Absorbents) clay was added to the ink. The ink was printed as in C-1 and the results are shown in Table 1.

Example 2 (E-2)

This ink was made the same as C-1, except 20.0 g of a 5 wt. % dispersion of Laponite® RDS clay was added to the ink. The ink was printed as in C-1 and the results are shown in Table 1.

Example 3 (E-3)

This ink was made the same as C-1, except 4.0 g of Laponite® RDS clay was added to the ink. The ink was printed as in C-1 and the results are shown in Table 1.

TABLE 1

| Example | Clay (Wt. %) | D-max | Dry time Density | Dry Time Density Minus D-min of Paper |
| --- | --- | --- | --- | --- |
| C-1 (Control) | None | 2.26 | 0.20 | 0.11 |
| E-1 | Laponite ® RDS (0.5) | 2.12 | 0.12 | 0.03 |
| E-2 | Laponite ® RDS (2.0) | 2.20 | 0.11 | 0.02 |
| E-3 | Laponite ® RDS (4.0) | 2.29 | 0.10 | 0.01 |

The above results show that use of the swelling clay in the ink jet ink in accordance with the invention resulted in a lower dry time density, only slightly above the D-min of the paper (0.09), in comparison to the control without any swelling clay. The ink jet ink employed in the invention thus has a faster drying time than the control.

Control Example 2 (C-2)

Control C-1 was repeated except that Black Pearls 880 (pigment black 7) (Cabot Chemical Co.) was used instead of pigment red 122 and the OMT surfactant was employed at 10.5 g. The ink preparation was the same as in C-1, except that an aliquot of the dispersion to yield 1.075 g of pigment was added to make the ink. The D-min of the bond paper was 0.07. The results are shown in Table 2.

Example 4 (E-4)

This ink was made the same as C-2, except 12.5 g of a 5 wt. % dispersion of Laponite® RDS clay was added to the ink. The ink was printed as in C-1 and the results are shown in Table 2.

Example 5 (E-5)

This ink was made the same as C-2, except 25 g of a 5 wt. % dispersion of Laponite® RDS clay was added to the ink. The ink was printed as in C-1 and the results are shown in Table 2.

TABLE 2

| Example | Clay (Wt. %) | D-max | Dry time Density | Dry Time Density Minus D-min of Paper |
| --- | --- | --- | --- | --- |
| C-2 (Control) | None | 1.95 | 0.25 | 0.18 |
| E-4 | Laponite ® RDS (1.25) | 2.05 | 0.11 | 0.04 |
| E-5 | Laponite ® RDS (2.5) | 2.25 | 0.08 | 0.01 |

The above results show that use of the swelling clay in an ink jet ink with a different pigment in accordance with the invention resulted in a lower dry time density in comparison to the control without any swelling clay. The ink jet ink employed in the invention thus has a faster drying time than the control.

Control Example 3 (C-3)

Control C-1 was repeated except that Hansa. Brilliant Yellow Pigment (Yellow 74) (Hoechst Chemical Co.) was used instead of pigment red 122 and the OMT surfactant was employed at 12 g. The ink preparation was the same as in C-1, except that an aliquot of the dispersion to yield 1.25 g of pigment was added to make the ink. The optical density of ink transferred at 0 minutes was measured and represents a "dry time density". The D-min of the bond paper was 0.07. The results are shown in Table 3.

Example 6 (E-6)

This ink was made the same as C-3, except 10 g of a 5 wt. % dispersion of Laponite® RDS clay was added to the ink. The ink was printed as in C-1 and the results are shown in Table 3.

TABLE 3

| Example | Clay (Wt. %) | D-max | Dry time Density | Dry Time Density Minus D-min of Paper |
| --- | --- | --- | --- | --- |
| C-3 (Control) | None | 1.90 | 0.30 | 0.23 |
| E-6 | Laponite ® RDS (1.0) | 1.70 | 0.11 | 0.04 |

The above results show that use of the swelling clay in an ink jet ink with a different pigment in accordance with the invention resulted in a lower dry time density, only slightly above the D-min of the paper (0.07), in comparison to the control without any swelling clay. The ink jet ink employed in the invention thus has a faster drying time than the control.

Control Example 4 (C-4)

Control C-1 was repeated except that 35 g of bis (phthalocyanyl-alumino)tetraphenyldisiloxane (Eastman Kodak Co.) was used instead of pigment red 122, the OMT surfactant was employed at 17.5 g and the deionized water was employed at 197.5 g. The ink preparation was the same as in C-1, except that an aliquot of the dispersion to yield 1.0 g of pigment was added to make the ink. The optical density of ink transferred at 0 minutes was measured and represents a "dry time density". The D-min of the bond paper was 0.09. The results are shown in Table 4.

Example 7 (E-7)

This ink was made the same as C-4, except 7.5 g of a 5 wt. % dispersion of Na-Montmorillonite SWy-2 (University of Missouri-Columbia, Source Clay Minerals Repository) clay was added to the ink. The ink was printed as in C-1 and the results are shown in Table 4.

Example 8 (E-8)

This ink was made the same as C-4, except 15 g of a 5 wt. % dispersion of Na-Montmorillonite SWy-2 clay was added to the ink. The ink was printed as in C-1 and the results are shown in Table 4.

Example 9 (E-9)

This ink was made the same as C-4, except 25 g of a 5 wt. % dispersion of Na-Montmorillonite SWy-2 clay was added to the ink. The ink was printed as in C-1 and the results are shown in Table 4.

TABLE 4

| Example | Clay (Wt. %) | D-max | Dry time Density | Dry Time Density Minus D-min of Paper |
| --- | --- | --- | --- | --- |
| C-4 (Control) | None | 2.09 | 0.20 | 0.11 |
| E-7 | Swy-2 (0.75) | 1.50 | 0.16 | 0.07 |
| E-8 | Swy-2 (1.5) | 1.44 | 0.11 | 0.02 |
| E-9 | Swy-2 (2.5) | 1.37 | 0.11 | 0.02 |

The above results show that use of a different swelling clay in an ink jet ink with a different pigment in accordance with the invention resulted in a lower dry time density, only slightly above the D-min of the paper (0.09), in most concentrations in comparison to the control without any swelling clay. The ink jet ink employed in the invention thus has a faster drying time than the control.

Control Example 5 (C-5)

This control is the same as C-2. The optical density of ink transferred at 2 minutes was measured and represents a "dry time density".

Example 10 (E-10)

This ink was made the same as C-5, except 7.5 g of a 5 wt. % dispersion of Na-Montmorillonite SWy-2 clay was added to the ink. The ink was printed as in C-1 and the results are shown in Table 5.

Example 11 (E-11)

This ink was made the same as C-4, except 15 g of a 5 wt. % dispersion of Na-Montmorillonite SWy-2 clay was added to the ink. The ink was printed as in C-1 and the results are shown in Table 5.

TABLE 5

| Example | Clay (Wt. %) | D-max | Dry time Density | Dry Time Density Minus D-min of Paper |
| --- | --- | --- | --- | --- |
| C-5 (Control) | None | 2.05 | 0.32 | 0.25 |
| E-10 | Swy-2 (0.75) | 1.6 | 0.23 | 0.16 |
| E-11 | Swy-2 (1.5) | 1.6 | 0.09 | 0.02 |

The above results show that use of a different swelling clay in an ink jet ink with a different pigment in accordance with the invention resulted in a lower dry time density in comparison to the control without any swelling clay. The ink jet ink employed in the invention thus has a faster drying time than the control.

Control Example 6 (C-6)

This control is the same as C-1.

Example 12 (E-12)

This ink was made the same as C-6, except 4.2 g of a 3 wt. % dispersion of Laponite® RD clay was added to the ink. The ink was printed as in C-1 and the results are shown in Table 6.

Example 13 (E-13)

This ink was made the same as C-6, except 8.33 g of a 3 wt. % dispersion of Laponite® RD clay was added to the ink. The ink was printed as in C-1 and the results are shown in Table 6.

TABLE 6

| Example | Clay (Wt. %) | D-max | Dry time Density | Dry Time Density Minus D-min of Paper |
| --- | --- | --- | --- | --- |
| C-6 (Control) | None | 2.26 | 0.20 | 0.11 |
| E-12 | Laponite ® RD (0.25) | 2.21 | 0.17 | 0.08 |
| E-13 | Laponite ® RD (0.5) | 2.15 | 0.12 | 0.03 |

The above results show that use of a different swelling clay in an ink jet ink in accordance with the invention resulted in a lower dry time density in comparison to the control without any swelling clay. The ink jet ink employed in the invention thus has a faster drying time than the control.

The invention has been described in detail with particular reference to certain preferred embodiments thereof, but it will be understood that variations and modifications can be effected within the spirit and scope of the invention.

What is claimed is:

1. An ink jet printing method, comprising the steps of:
   A) providing an ink jet printer that is responsive to digital data signals;
   B) loading said printer with ink-receptive substrates;
   C) loading said printer with an ink jet ink composition comprising a water carrier, from about 0.5% to about 30% by weight of a pigment and from about 0.1 to about 10% by weight of a swelling clay of montmorillonite, bentonite, clinoptilolite, vermiculite, magadite, smectite, laponite or beidellite; and
   D) printing on an ink-receptive substrate using said ink jet ink in response to said digital data signals.

2. The method of claim 1 wherein said composition comprises from about 30 to about 90% by weight of water and from about 10 to about 50% by weight of a humectant.

3. The method of claim 1 wherein said swelling clay is laponite.

4. The method of claim 3 wherein said laponite is

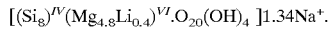

5. The method of claim 1 wherein said swelling clay is present at a concentration from about 0.25 to about 5% by weight of said ink jet ink composition.

6. The method of claim 1 wherein said pigment is present at a concentration of from about 1% to about 5% by weight of said ink jet ink composition.

7. The method of claim 2 wherein said humectant comprises a polyhydric alcohol or a nitrogen-containing cyclic compound.

8. The method of claim 7 wherein said polyhydric alcohol is a mixture of glycerol and diethylene gylycol.

9. The method of claim 8 wherein said mixture of glycerol and diethylene glycol is present at a concentration of from about 15 to about 30 wt. % by weight of said ink jet ink composition.

* * * * *